(12) United States Patent
Vermeire et al.

(10) Patent No.: US 7,489,141 B1
(45) Date of Patent: Feb. 10, 2009

(54) SURFACE MICRO SENSOR AND METHOD

(75) Inventors: Bert M. Vermeire, Phoenix, AZ (US);
Farhang F. Shadman, Tucson, AZ (US)

(73) Assignee: Environmental Metrology Corporation, Tucson, AZ (US)

( * ) Notice: Subject to any disclaimer, the term of this patent is extended or adjusted under 35 U.S.C. 154(b) by 496 days.

(21) Appl. No.: 11/205,636

(22) Filed: Aug. 16, 2005

Related U.S. Application Data

(60) Provisional application No. 60/624,131, filed on Nov. 2, 2004, provisional application No. 60/602,449, filed on Aug. 18, 2004.

(51) Int. Cl.
*G01R 27/00* (2006.01)
*G01R 27/04* (2006.01)
*G01R 27/32* (2006.01)
*G01R 27/08* (2006.01)

(52) U.S. Cl. .................. 324/646; 324/71.1; 324/693

(58) Field of Classification Search .................. 324/646, 324/71.1, 693
See application file for complete search history.

(56) References Cited

U.S. PATENT DOCUMENTS

| | | | |
|---|---|---|---|
| 5,861,754 A | 1/1999 | Ueno et al. | 324/660 |
| 6,145,384 A | 11/2000 | Ikeda et al. | 73/780 |
| 6,294,063 B1 | 9/2001 | Becker et al. | 204/450 |
| 6,437,551 B1 | 8/2002 | Krulevitch et al. | 324/71.1 |
| 6,903,918 B1 | 6/2005 | Brennan | 361/306.1 |
| 2003/0156998 A1 | 8/2003 | Gilligan et al. | 422/102 |
| 2004/0120854 A1* | 6/2004 | Heath et al. | 422/57 |
| 2004/0245580 A1 | 12/2004 | Lin | 257/379 |

OTHER PUBLICATIONS

K. Romero et al "In-situ analysis of wafer surface and deep trench rinse," Cleaning Technology in Semiconductor Device Manufacturing VI, The Electrochemical Society, 2000.
A.D. Hebda et al, "Fundamentals of UPW rinse: analysis of chemical removal from flat and patterned wafer surfaces" Cleaning Technology in Semiconductor Device Manaufacturing VI, The Electrochemical Society, 2000.
J. Yan et al. "Test Structures for Analyzing Mechanisms of Wafer Chemical Contaminant Removal", IEEE International Conference on Microelectronic Test Structures, pp. 209-213, Mar. 2003.

* cited by examiner

*Primary Examiner*—Vincent Q Nguyen
*Assistant Examiner*—Amy He
(74) *Attorney, Agent, or Firm*—Eric A. Gifford

(57) ABSTRACT

The present invention provides a micro sensor for monitoring the cleaning and drying processes of surfaces of dielectric films, micro features in porous dielectric films and biologic or other cells common in microelectronics fabrication, MEMS fabrication or microbiology test system fabrication. By embedding electrodes in the surface of a supporting dielectric, the sensor can probe the surface and pores of a covering dielectric or a cell on the covering dielectric. The addition of a guard reduces the effects of any parasitic capacitance, which extends the measurement bandwidth of the sensor and allows it to be manufactured at the scale of a single cell, a feature that is particularly important for applications in microbiology.

18 Claims, 12 Drawing Sheets

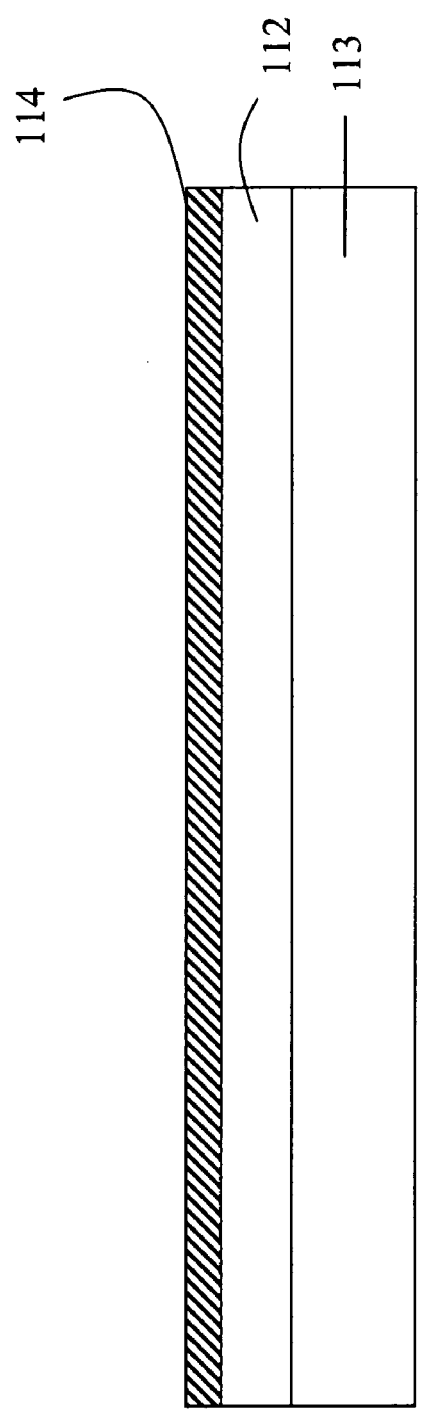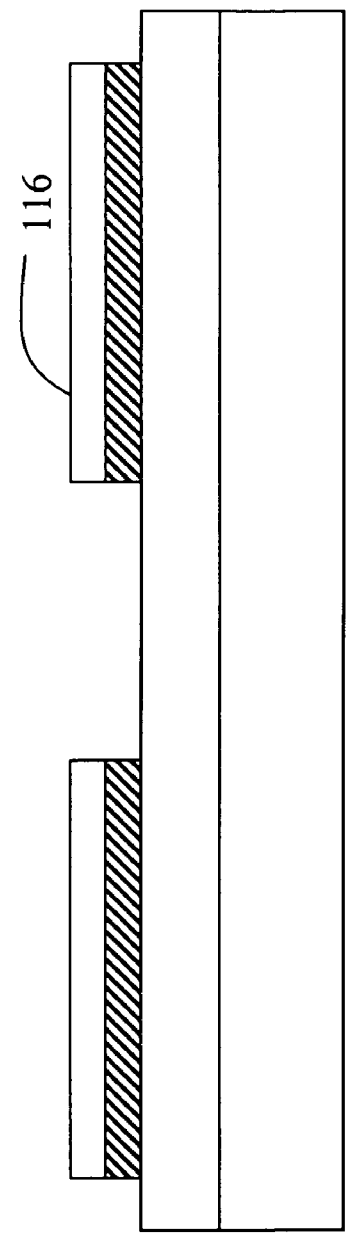

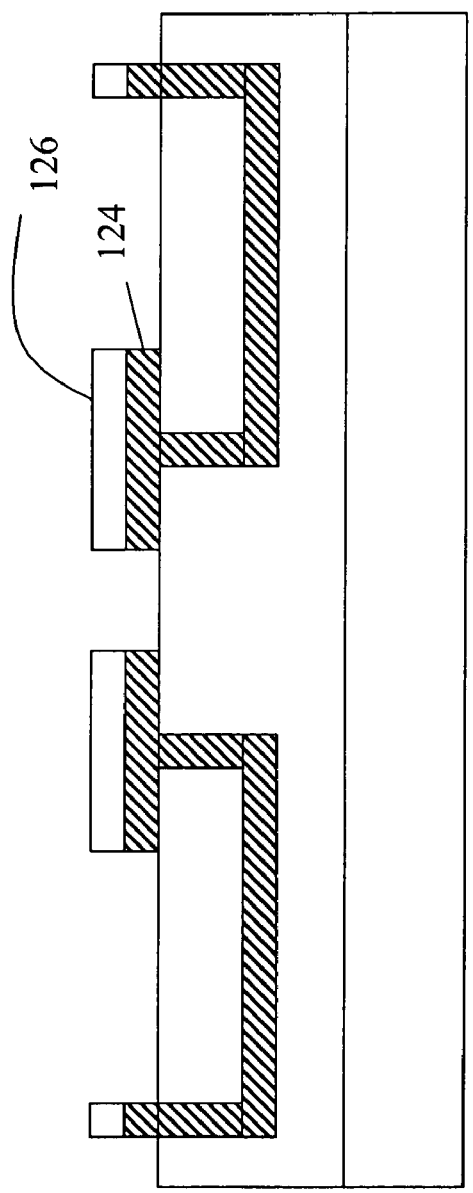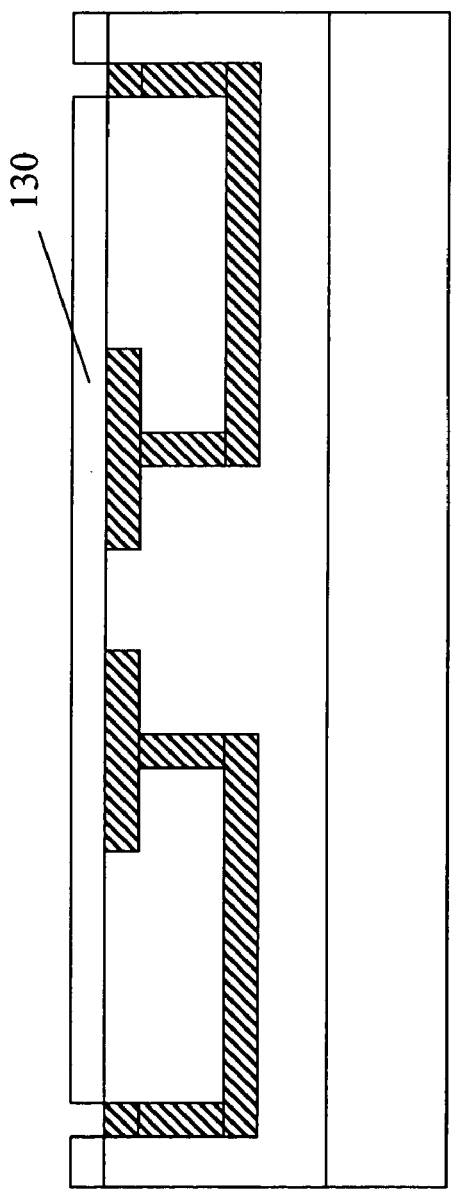
Fig. 5f
Fig. 5g

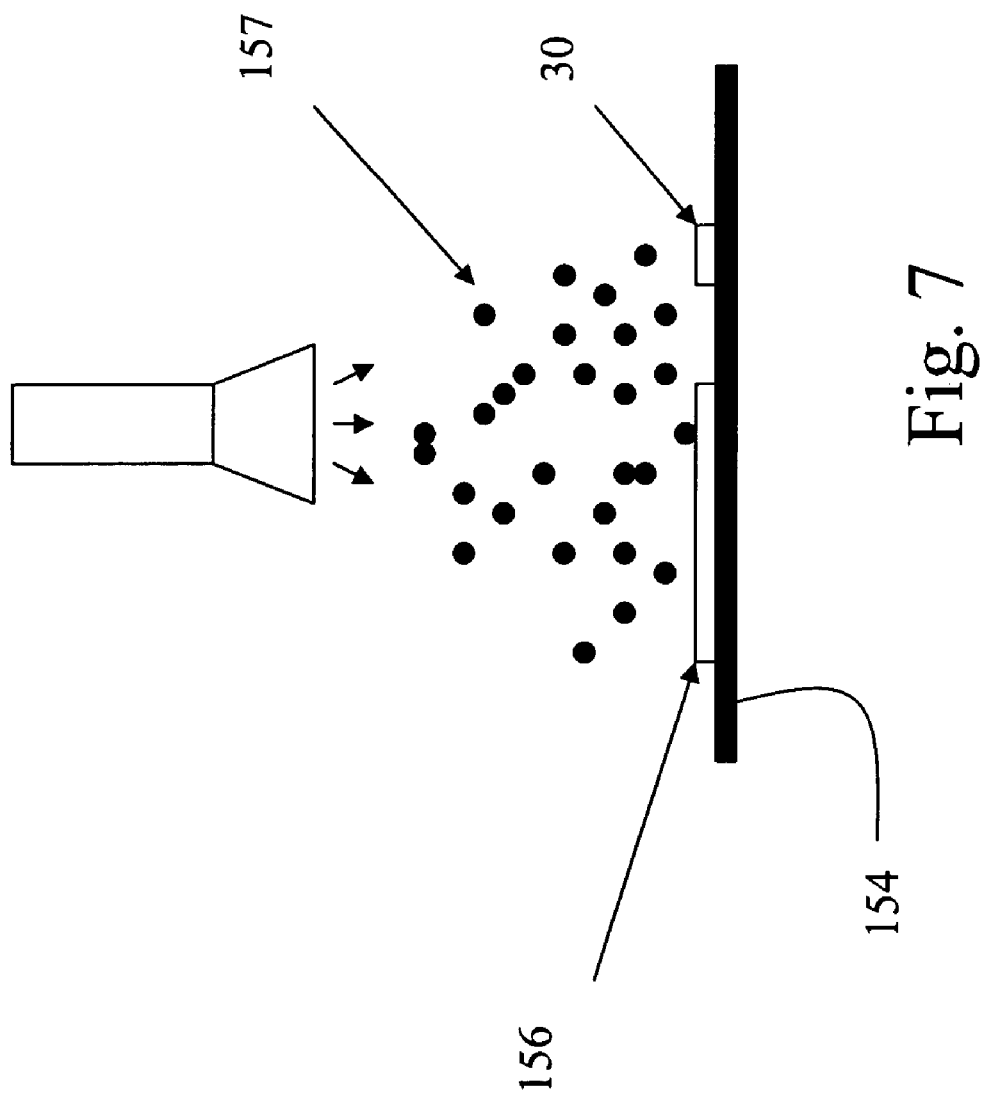

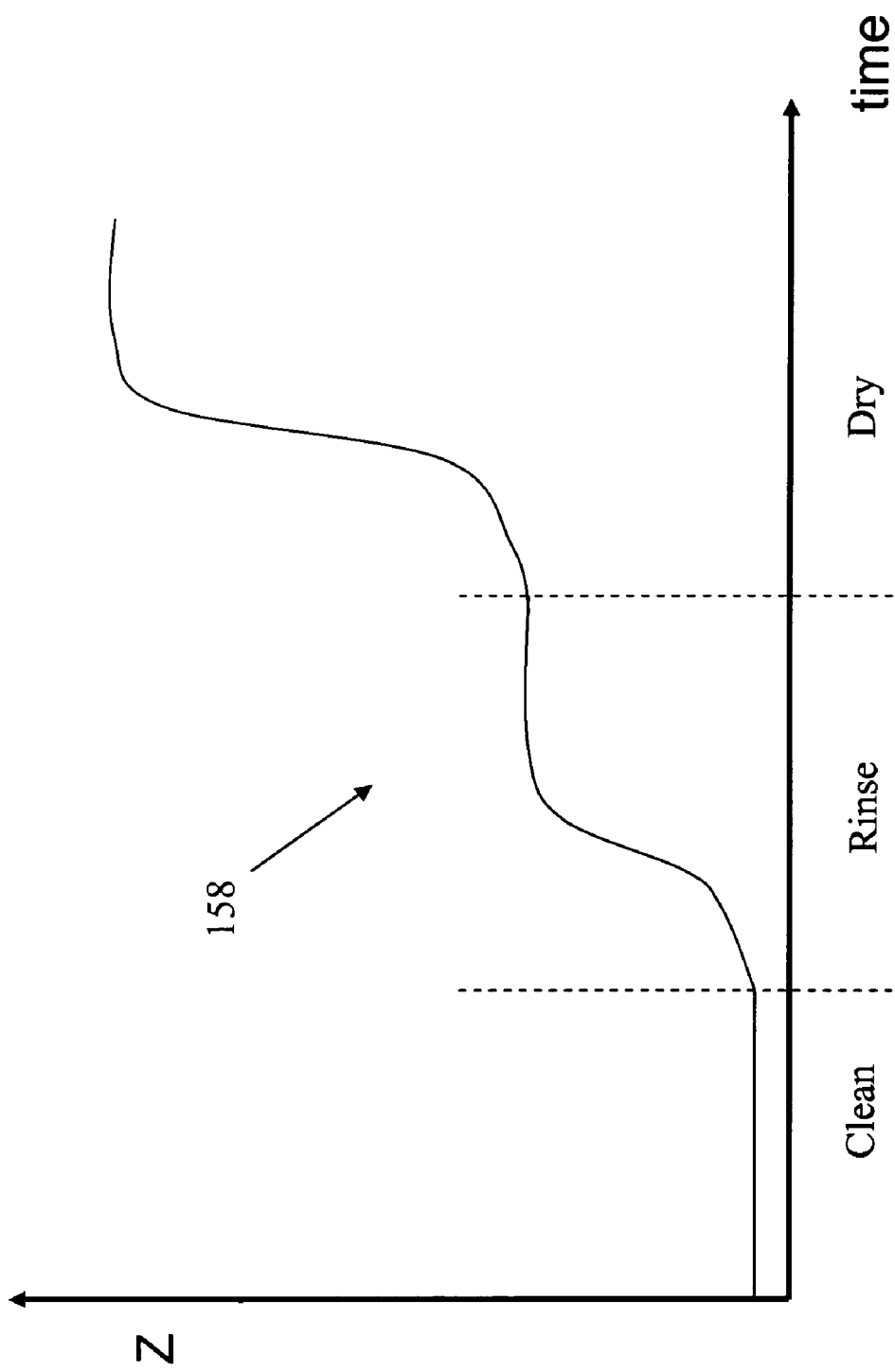

SURFACE MICRO SENSOR AND METHOD

CROSS-REFERENCE TO RELATED APPLICATIONS

This application claims benefit of priority under 35 U.S.C. 119(e) to U.S. Provisional Application No. 60/602,449 entitled "Electrochemical Residue Sensor for Porous Films" filed on Aug. 18, 2004 AND U.S. Provisional Application No. 60/624,131 entitled "Method For Impedance Monitoring Of Fluids And Gases In High Aspect Ratio Structures And Method For Manufacturing Such A Monitor" filed on Nov. 2, 2004, the entire contents of which are incorporated by reference.

BACKGROUND OF THE INVENTION

1. Field of the Invention

This invention relates to monitoring the residue on a surface during a chemical treatment of the surface, such as cleaning and drying processes during the manufacture of ICs, MEMS and other micro devices and more specifically to a micro sensor for monitoring residue on and in dielectric films and cells on the surface of the sensor.

2. Description of the Related Art

A major challenge in manufacturing of the micro and nano devices is the cleaning and drying of very small "micro features". These micro features are fabricated in various processing steps and can be very small voids such as gaps, holes, vias or trenches that are intentionally etched, dielectric surfaces, pores in the dielectric surface material or possibly cells (biologic or other) on the surface. Cleaning and drying occur repeatedly during the processing chain and are responsible for a significant part of the total processing time and for the consumption of much of the water, chemicals and energy.

In Integrated Circuits, MEMS and other micro device manufacturing well controlled cleaning and drying of surfaces and micro features are essential to avoid deformation of layers and improper adhesion of moving parts. Improper cleaning and drying would have a significant effect on manufacturing yield and device performance and reliability in both semiconductor and MEMS fabrication. Over-cleaning, over-rinsing or over-drying results in excessive use of chemicals, water and energy and also increases cycle time and potentially causes yield loss. Therefore, there is a strong economic and environmental incentive to use a process that is "just good enough".

The surfaces and fine structures left behind after processes such as etching, deposition, and patterning, need to be cleaned and the reaction by-products need to be removed often down to trace levels. This usually involves three steps: 1) application of a cleaning solution; 2) rinsing and/or purging using ultra pure water or other rinsing solutions; and 3) drying by removing and purging the traces of any solvents used during rinsing. Due to the undesirable surface tension associated with aqueous chemicals and non-wetting nature of most future dielectrics, industry is pursing the development of) processes based on supercritical fluids such as supercritical carbon dioxide for cleaning and pattern development. Measurement of cleanliness under these processing conditions is very critical.

Cleaning, rinsing, and subsequent drying processes are often performed and controlled almost "blindly" and based on trial and error or past experience. The way these processes are monitored and controlled presently is based on ex-situ testing of wafer, chips, or structures. Within the process tool, fixed recipes are provided by tools and process suppliers. Run-by-run adjustments or control are based on external and delayed information on product performance or product yields. The key reason for this inefficient and costly approach is that no sensors or techniques are available to measure the cleanliness and monitor the removal of impurities from micro features—to measure cleanliness where it actually counts. The sensors that are currently available are used in the fabs to monitor the conditions of fluid inside the process vessels and tanks, but far away from the inside of micro features (that is what needs to be monitored; it is also the bottleneck of cleaning and drying). The present monitoring techniques and devices do not provide realistic and accurate information on the cleanliness and condition of micro features.

Industry currently works around this problem while waiting for a solution; the process condition and cleaning and drying are often set with very large factors of safety (over-cleaning and over-rinsing). Large quantities of water and other chemicals are used (much more than what is really needed). This results in wasted chemicals, increased process time, lowered throughput, increased cost, and it causes reliability issues because of lack of process control.

K. Romero et al "In-situ analysis of wafer surface and deep trench rinse," Cleaning Technology in Semiconductor Device Manufacturing VI, The Electrochemical Society, 2000 propose a device for monitoring the process in-situ for high aspect ratio trenches. The trench device comprises a pair of conducting electrodes (Poly-Si) sandwiched between dielectric ($SiO_2$) layers on opposite sides of a trench. An impedance analyzer applies a measurement voltage to the electrodes, which carry the measurement signal (voltage and current) to the trench. The impedance analyzer measures the impedance between its two terminals (ratio of voltage and current and the phase difference between the voltage and current).

For the sensor to be useful as a monitor of the fluid in the micro feature, the total parasitic capacitance between the electrodes and the substrate and/or fluid must be sufficiently small to allow an electrical measurement of the total impedance between the electrodes to resolve the solution resistance $R_{sol'n}$ and/or the interface double layer capacitance $C_{d1}$. If the parasitic capacitance dominates the total electrical response, then the circuit will not have a good signal to noise ratio and the sensor will not be very sensitive. In the paper by Romero et al., the parasitic capacitance was found to dominate the solution resistance. At the parasitic capacitance measured (88 pF), the equivalent circuit calculation predicts no discernable impedance variation between highest and lowest trench resistances. The full ionic concentration range was not experimentally resolvable in comparison to electronic noise.

Romero's trench device does not address in-situ monitoring of dielectric surfaces and does resolve the problem of parasitic capacitance.

SUMMARY OF THE INVENTION

The present invention provides a micro sensor for monitoring the cleaning and drying processes of surfaces of dielectric films, micro features in porous dielectric films and biologic or other cells common in microelectronics fabrication, MEMS fabrication or microbiology test system fabrication. By embedding electrodes in the surface of a supporting dielectric, the sensor can probe the surface and pores of a covering dielectric or a cell on the covering dielectric. The addition of a guard reduces the effects of any parasitic capacitance, which extends the measurement bandwidth of the sensor and allows it to be manufactured at the scale of a single cell, a feature that is particularly important for applications in microbiology.

In one embodiment the micro sensor comprises first and second electrodes embedded in the surface of a supporting dielectric layer with a thin covering dielectric over the electrodes and supporting dielectric layer. The electrodes are adapted to receive an ac signal to measure the impedance of a surface segment of the covering dielectric between the electrodes. The covering dielectric can be the same or a dielectric as the supporting dielectric and may be porous. The micro sensor can be adapted to measure the impedance of a cell (biologic or other) on the surface of the covering dielectric with the cell covering at least part of both electrodes.

In another embodiment, the micro sensor is configured with a guard that reduces the effects of any parasitic capacitance. Electrical connectors are embedded in the supporting dielectric beneath the electrodes to carry the ac measurement signal to the electrodes. These connectors have parasitic capacitances to both the substrate below and fluid above. Conductive guards are embedded in the supporting dielectric and buffered so that their voltages closely track the electrode voltages to shield the connectors from the surrounding environment and thereby reduce the loss of measurement signal through the parasitic capacitance associated with the connectors. The guards suitably comprise conductive layers that lie below the connector to reduce the parasitic capacitance to the substrate and above the connector to reduce the parasitic capacitance to the fluid.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5a through 5g are section views of a process for fabricating the micro sensor shown in FIG. 2;

FIG. 7 is a diagram of an alternate clean/rinse/dry process using the micro sensor; and FIG. 8 is a plot of impedance vs. time for a representative clean/rinse/dry cycle.

DETAILED DESCRIPTION OF THE INVENTION

The present invention provides a surface micro sensor for monitoring the cleaning and drying processes on the surface of a dielectric film during the manufacture of ICs, MEMS and other micro devices. The surface of the dielectric can be non-porous, in which case the surface cleaning process is rate limited by the desorption of species from the surface or by removal of the species away from the surface. The dielectric can also be porous, or have other micro features present in it. Furthermore, a cell (biologic or other) may be placed on the surface and monitored.

Figure 1:
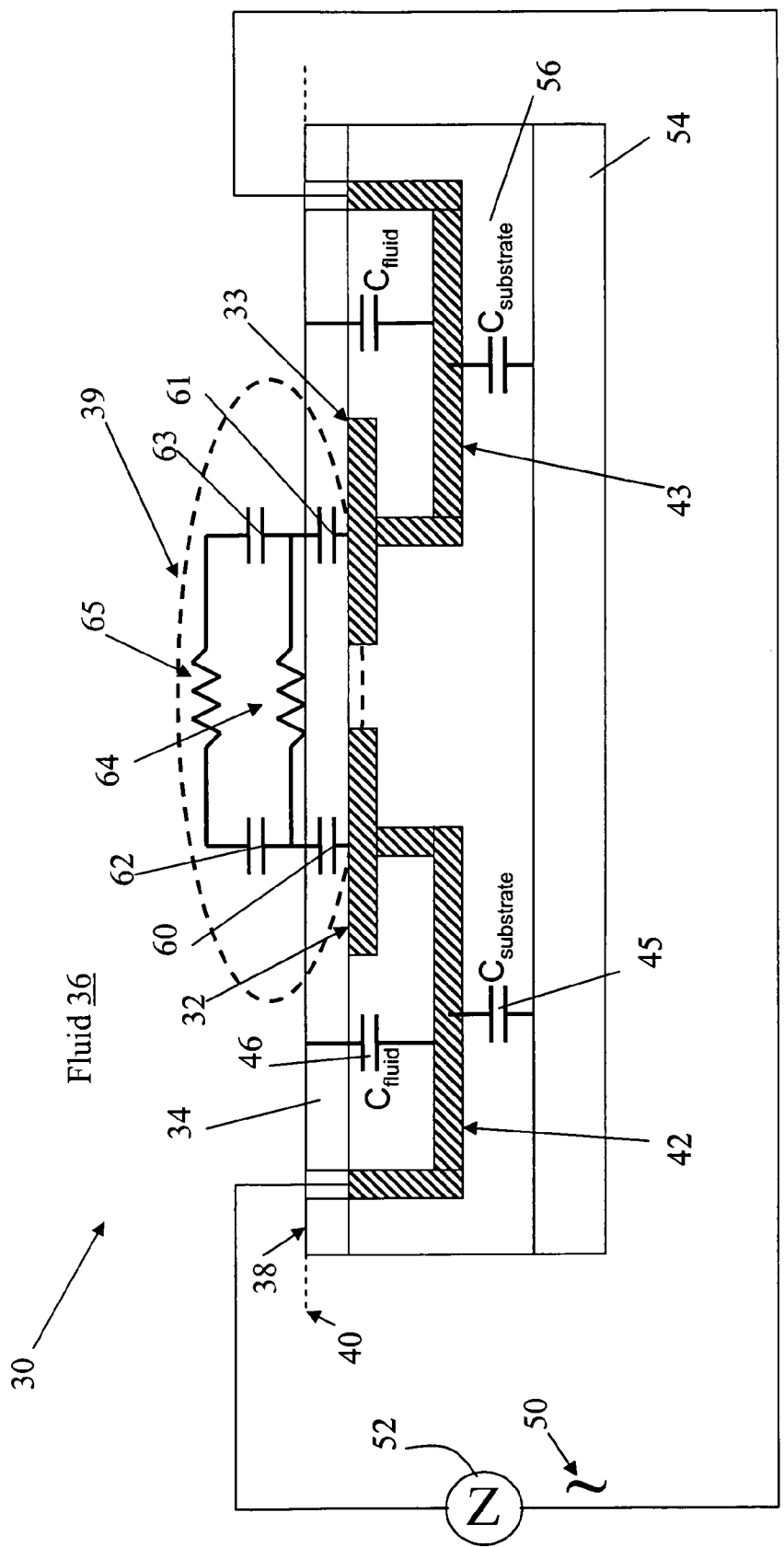
FIG. 1 is a section view and partial electrical equivalent schematic of a surface micro sensor having two electrodes covered with a dielectric film immersed in a fluid in accordance with the present invention.

As shown in FIG. 1, an exemplary embodiment of a surface micro sensor 30 for in-situ monitoring of the process of cleaning, rinsing and drying of surfaces and the micro features in those surfaces comprises two conducting electrodes 32 and 33 (e.g. copper or doped polysilicon with a typical thickness of 1 µm) that lie in the same plane, embedded in the surface of a supporting dielectric 56 on a substrate 54 (e.g. a silicon wafer or a glass slide), and covered by a thin dielectric layer 34 (e.g., silicon dioxide ($SiO_2$), silicon nitride ($Si_3N_4$) and non-porous low-K organic dielectric materials). The covering dielectric may be as thin as a few nm, e.g. 10 nm or less, and the electrodes may be spaced as close a few microns, e.g. 2 µm or less. The "active" part of the electrodes lies on the surface of the supporting dielectric. A surface segment 39 of dielectric 34 is defined between the conducting electrodes at the fluid-solid interface 40. The electrodes are adapted to receive an ac measurement signal 50 to measure the impedance of surface segment 39 when the micro sensor is immersed in a fluid 36, being rinsed or drying. An impedance analyzer 52 measures the impedance (ratio of voltage and current and phase difference between the voltage and current) of the surface section 39 between the electrodes via connectors 42 and 43 (e.g. copper or doped polysilicon) embedded in the supporting dielectric 56 beneath the electrodes that carry the measurement signal 50 to electrodes 32 and 33.

Surface segment 39 has an electrical equivalent circuit consisting of capacitors 60 and 61 formed between the electrodes and the solution surface 38, capacitors 62 and 63 formed between electrodes and the surface double layers, the surface resistance 64 and the bulk fluid resistance 65. At solid-solution interfaces, an interface double layer forms because charges in the solution that are mobile (ions) respond to the presence of fixed charges on the solid. The interface double layer is responsible for capacitance $C_{d1}$ (capacitors 62 and 63) between the dielectric 34 and the solution 36, which forms an impedance $Z_{d1}=1/j\omega C_{d1}$ where $\omega$ is the measurement signal radial frequency in series with the bulk solution resistance and which shunts the surface resistance. The sensor can extract the individual components if the impedance measurement is performed over a range of measurement signal frequencies. Non-linear least squares fitting of the impedance data, a well known method from the domain of impedance spectroscopy, results in the individual component values.

In an alternate embodiment, the covering dielectric layer 34 is a porous dielectric material (e.g. porous low-K organic dielectric material). The porous dielectric material is suitably a different material than the supporting dielectric 56. In that case, the pores fill with fluid (i.e. the porous material is soaked) and the sensor's electrical response is indicative of the residual contamination inside the pores in the porous material because the value of the electrode-solution capacitance 60 and 61 changes.

Figure 2:
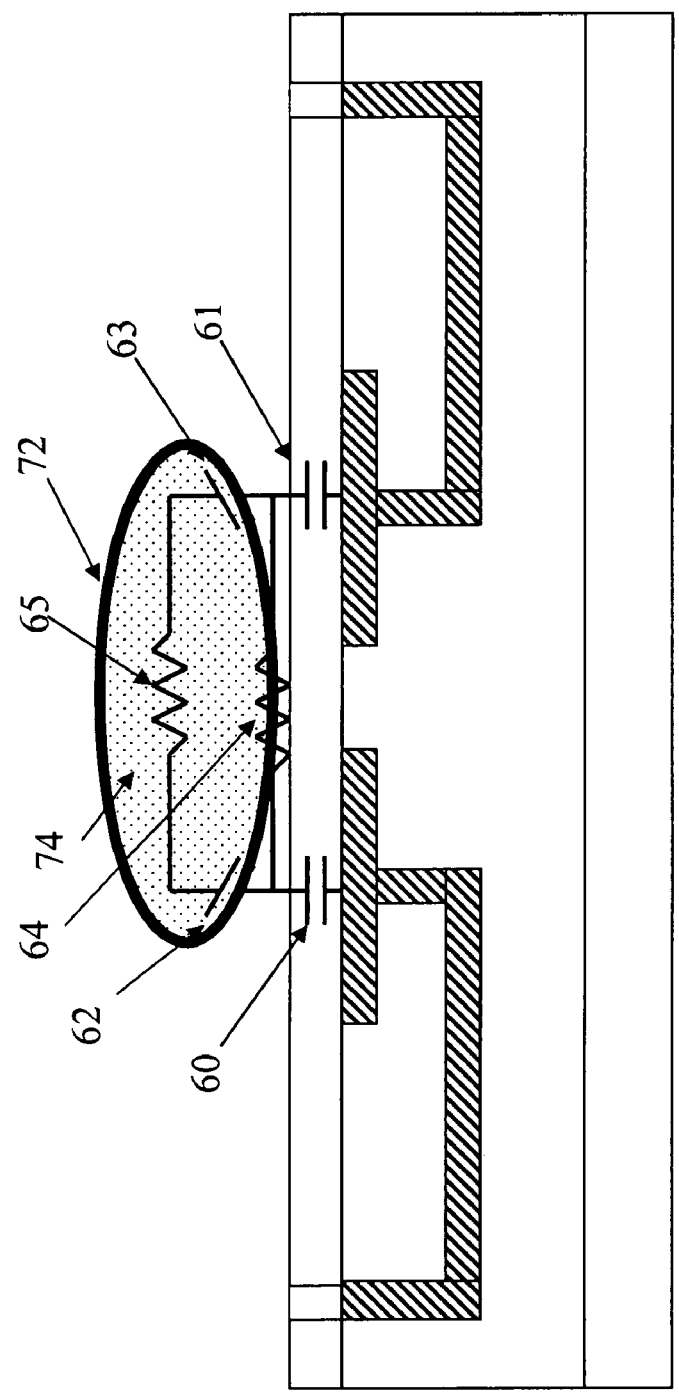
FIG. 2 is a section view and partial electrical equivalent schematic of a surface sensor covered with a living cell.

As shown in FIG. 2, in an alternate embodiment a cell (biologic or other) covers the surface segment of the covering dielectric 34. The cell must cover at least part of each electrode. The measured impedance is now a parallel combination of the surface segment and the cell, however in a living biologic cell the conductivity of cell membrane 72 is the main contributor to the surface resistance 64, the cell's membrane capacitance is the main contributor to the double layer capacitance $C_{d1}$ 62 and 63 and the cell's cytoplasm 74 is the main contributor to the bulk fluid resistance 65 so the individual components of the cell can be extracted. Changes to the cell's conductivity (for example due to dehydration as it reacts to a toxin in its environment) can now be observed in-situ by monitoring the surface sensor's impedance.

The surface sensor can also be used as a novel device and the related methodology to determine the presence of unknown toxic contaminants in water and their effects on selected model cells that represent living organ(s) in human body. The technology has a variety metrology and control applications and bridges the gap between the in-vitro and in-vivo testing approaches for toxicity assessment.

The objective of the surface sensor's use in this application is the direct probing of toxicity effects on cells in a fast and in-situ manner. The principle behind the proposed technology is a unique "test chip" that allows impedance micro-spectroscopy of an array of cells on special sites on the test chip. The sites are pairs of electrodes that are parts of the test chip unique microcircuit that allows detection of impedance across each pair of electrodes. The impedance of cells on each site is sensitive to the condition of the cell. If damaged or killed due to the effect of toxic compounds, or when undergoing significant metabolic change, the cells adsorbed on these sites go through a fast and significant change in electrical impedance, compared to the slow changes in a healthy cell population. Comparison of the pattern and the rate of change in the impedance pattern of exposed cells with that of healthy population (stored information) will provide information on the presence of toxic contaminants in water.

Some of the key features are rapid detection (in order of seconds to minutes), low cost, high selectivity in both contaminants and effects on specific organs, self contained (no external power supply or analysis devices), ready to use (no calibration or specialized operational procedures or expertise), and potentially a simple "go" or "no go" output.

Test chips based on this technology can be used as individual units for case-by-case water testing. Examples are testing water in unfamiliar surroundings, in military application by soldiers in the field, or in general by any user for environmental monitoring in remote areas with no auxiliary facilities, equipment, or power supply. The chips can be used by engineers and industrial practitioners in the operation and monitoring of water distribution and treatment facilities where a large number of sensors in multiple locations are needed.

The area of the surface segment and thus the required electrode area depend on the application. The area is typically quite large (few mm$^2$) when monitoring the micro feature in a porous dielectric layer. A large area is desirable to increase the signal to noise ratio. The area is typically quite small (few μm$^2$) when monitoring living cells on the surface, since these cells are quite small.

Connectors 42 and 43 have parasitic capacitance $C_{substrate}$ 45 to the substrate 54 and $C_{fluid}$ 46 to the fluid 36 that shunt some portion of the measurement signal around the surface segment equivalent circuit 80. If the shunt impedance is significantly lower than the surface segment equivalent circuit then the sensor's impedance output as measured by impedance analyzer 52 is dominated by the parasitic capacitances and the surface segment equivalent circuit can not be effectively measured nor the individual electrical components extracted.

For the sensor to be useful, the total effective parasitic capacitance must be sufficiently small to allow an electrical measurement of the surface segment equivalent circuit impedance. If the parasitic capacitance dominates the total electrical response, then the circuit will not have a good signal to noise ratio and the sensor will not be very sensitive. If the parasitic capacitance dominates, the equivalent circuit calculation predicts no discernable impedance variation between highest and lowest surface contaminant concentrations. If the electrodes are very large, then the capacitance of the electrode surface with the fluid is large enough to dominate, and the connector parasitic capacitances are relatively small. However, when the surface of the electrodes needs to be small (bio application), then the parasitic capacitances of the connector dominates and mitigation of the parasitic is important.

Figure 3A:
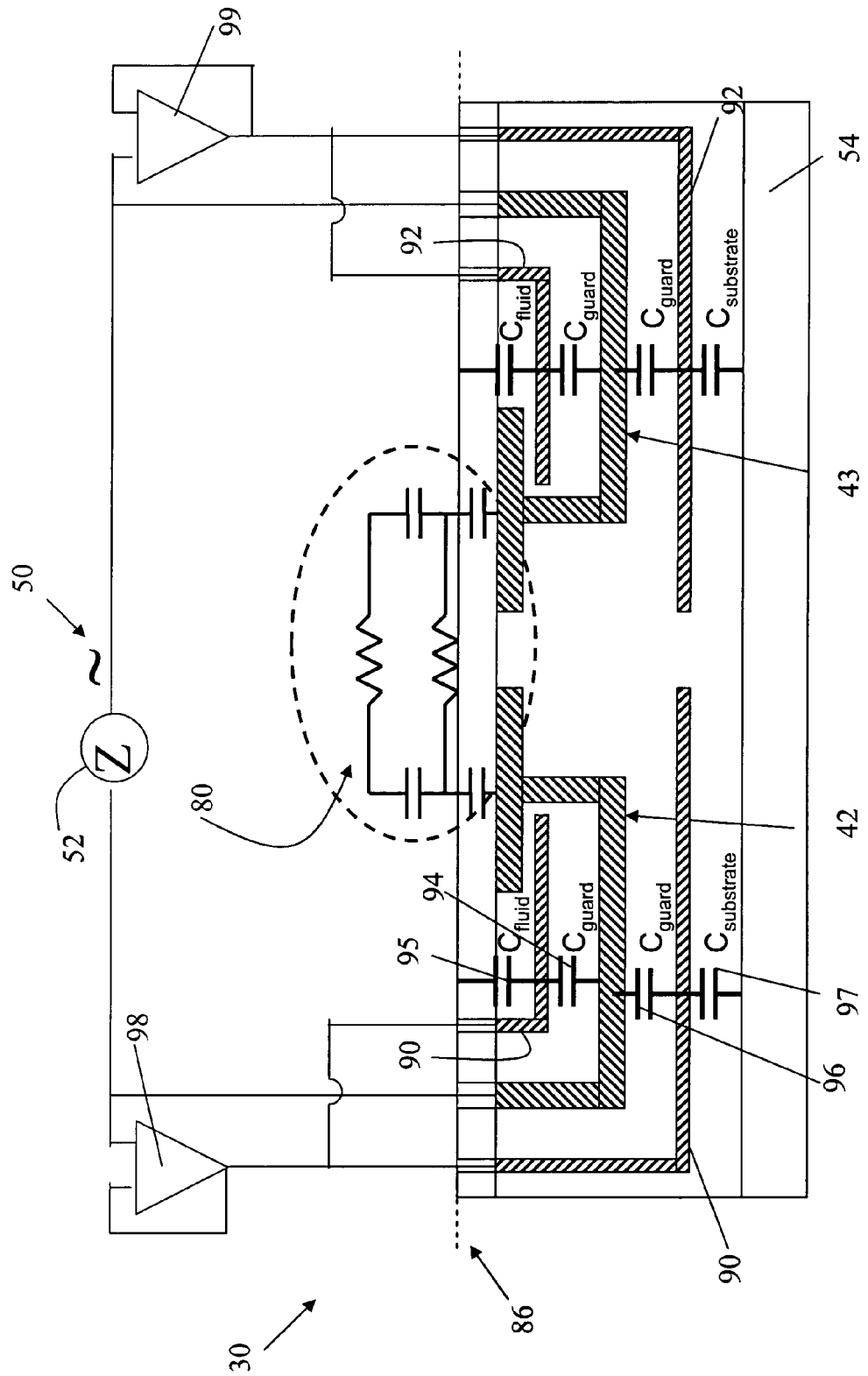
FIGS. 3a and 3b are respectively a section view of a surface micro sensor and partial electrical equivalent schematic of the micro sensor including a guard for shielding the sensor's electrodes to reduce the effects of parasitic capacitance and a schematic of an alternate electrode configuration.

To mitigate this parasitic capacitance, it can be beneficial to include guards 90 and 92 that shield connectors 42 and 43, respectively, as shown in FIG. 3a. A guard is an additional conductor that divides the supporting dielectric 56 between a connector and the substrate and/or the connector and the fluid into two parts that form two new capacitors, $C_{guard}$ 94 and $C_{fluid}$ 95 (together $C_{fluid}$ 46) or $C_{guard}$ 96 and $C_{substrate}$ 97 (together $C_{substrate}$ 45). $C_{guard}$ is the capacitor between the connector and the guard. $C_{fluid}$ is the capacitor between the guard and the fluid. $C_{substrate}$ is the capacitor between the guard and the substrate. If $C_{substrate}$ is small so that $1/\omega C_{substrate}$<<Impedance of the surface segment, (e.g. the substrate 54 is relatively thick and made from of dielectric), then the section of the guards between the connectors and the substrate may be omitted. If $C_{fluid}$ is small so that $1/\omega C_{fluid}$<<Impedance of the surface segment, then the section of the guards between the connectors and the fluid may be omitted.

The guards 90 and 92 are biased so that their voltages follow as closely as possible the respective electrode voltages at all times, even when the electrode voltage changes over time. The guard voltage need only track the ac component of the electrode voltage but suitably tracks the total instantaneous electrode voltage. The current required to make the guard voltage the same as the electrode voltage is supplied by buffers 98 and 99, e.g. an operation amplifier (OpAmp), not by the measurement signal 50. The Buffer reproduces the desired voltage without significant loading it.

Since the voltage difference between the electrode connector and its guard is several orders of magnitude lower than the voltage difference between the electrode connector and other conductors in the neighborhood of the sensor (substrate and fluid), the loss or distortion of the measurement signal through the parasitic capacitance $C_{guard}$ will be very, very small. The measurement signal is not affected by the capacitors $C_{fluid}$ and $C_{substrate}$ because the measurement signal is buffered prior to being applied to the guard. $C_{fluid}$ and $C_{substrate}$ must be charged and discharged by the guard buffer.

Figure 3B:
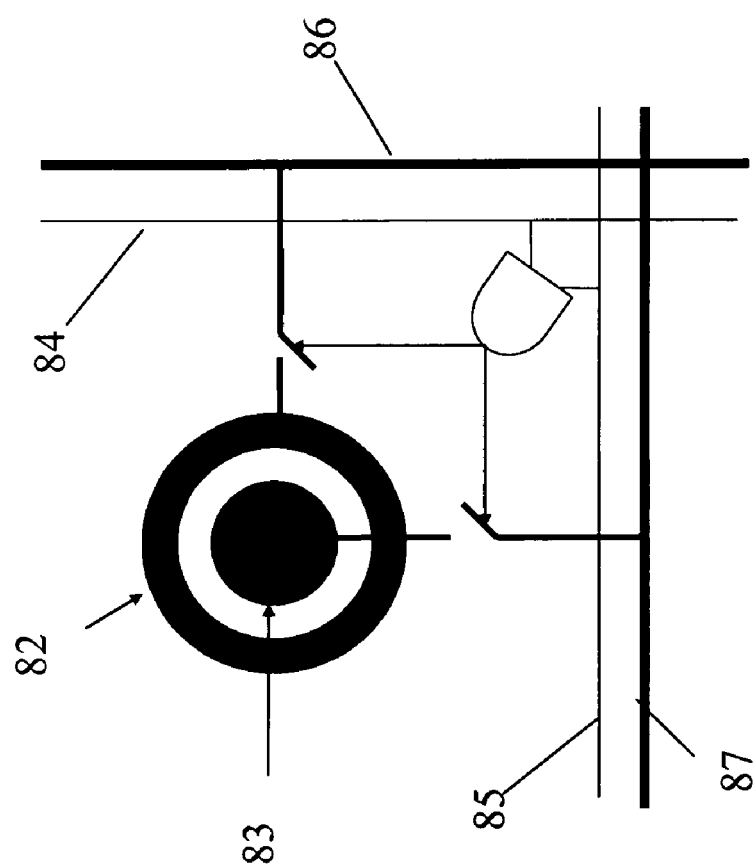

As shown in FIG. 3b, the electrodes are not required to be side by side. For example, electrodes 82 and 83 are concentric. Furthermore, a larger number of electrode pairs can be collocated on the same substrate in an array and each individual site selected using two control lines 84 and 85 that connect the electrodes to contact lines 86 and 87, respectively. In another embodiment, the electrodes could be arranged in fingered configuration, which has a small electrode spacing (e.g. 2 um or less) while at the same time having a very large electrode perimeter. Such a configuration would allow detection of particles or cells that cross this perimeter even if there are very few such cells present and if they are very small in size.

Figure 4A:
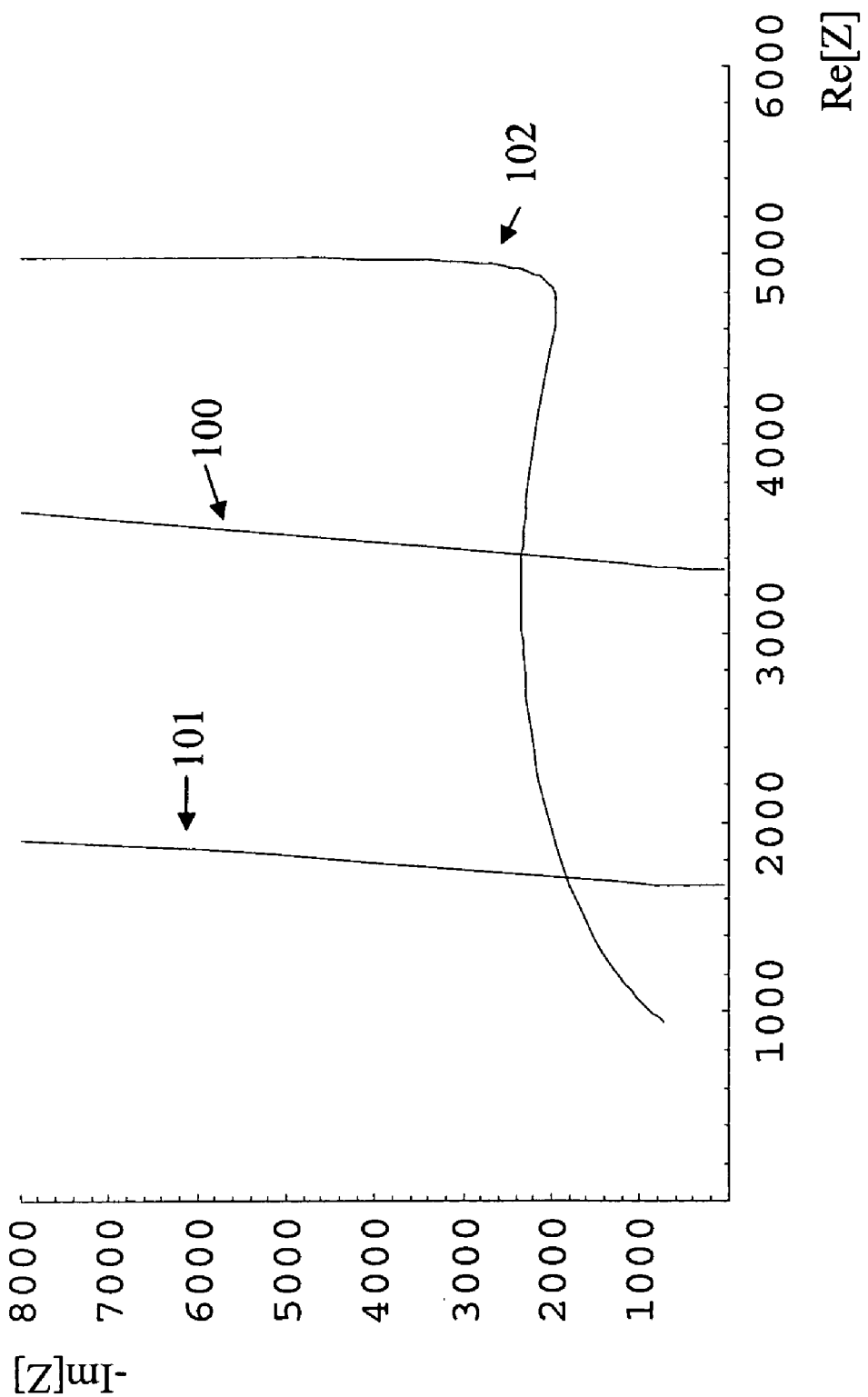
FIGS. 4a and 4b are calibration plots of impedance vs. frequency for the micro sensor illustrating the frequency extension achieved by the presence of the guard.

FIG. 4a is a plot of the surface micro sensor's ideal (i.e. when the capacitance of the electrode connector is zero) frequency response when the parameters of the electrical equivalent circuit of the surface segment changes. The imaginary part of the impedance (−Im[Z]) is plotted versus the real part of the impedance (Re[Z]) in what is commonly known as a Nyquist diagram. Different values in the equivalent circuit parameters lead to measurably different responses as the frequency changes from 1000 to 1000000 Hz: 100 (electrode-solution capacitance 60,61=5×10$^{-8}$ F, surface double layer capacitance 62,63=2×10$^{-8}$ F, surface resistance 64=5000Ω, bulk fluid resistance 65=10000Ω), 101 (electrode-solution capacitance 60,61=5×10$^{-8}$ F, surface double layer capacitance 62,63=2×10$^{-8}$ F, surface resistance 64=2000Ω, bulk fluid resistance 65=10000Ω) and 102 (electrode-solution capacitance 60,61=5×10$^{-8}$ F, surface double layer capacitance 62,63=2×10$^{-9}$ F, surface resistance 64=5000Ω, bulk fluid resistance 65=1000Ω).

Figure 4B:
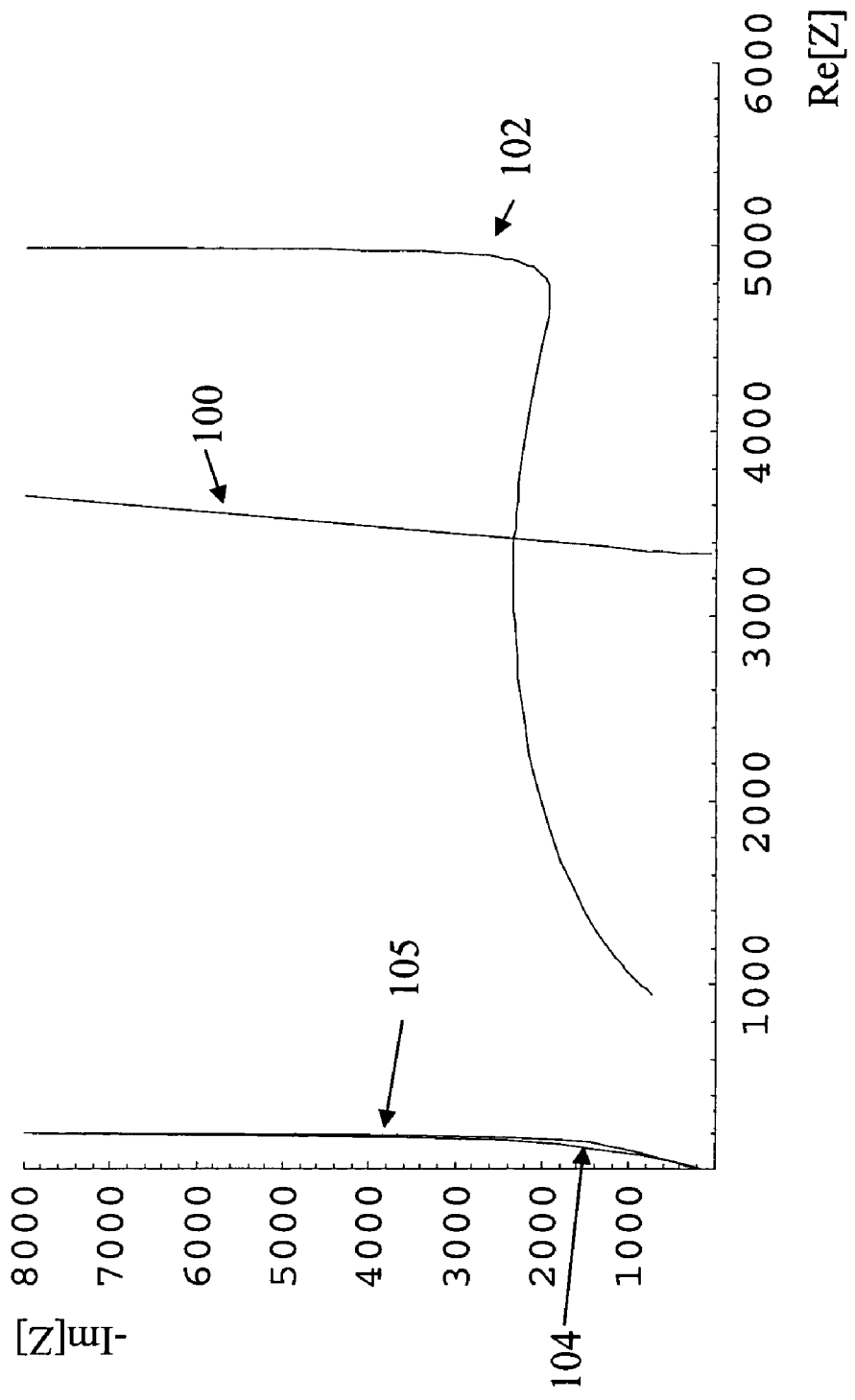

FIG. 4*b* is a plot of the surface micro sensor's frequency response with a guard 100,102 and without a guard 104,105 when an electrode connector parasitic capacitance of just 5×10$^{-8}$ F is present. Without a guard, the loss or distortion of the measurement signal through the parasitic capacitance will be very, very large. Hence, surfaces with different electrical equivalent properties will not have a different sensor response. With a guard, the loss or distortion of the measurement signal through the parasitic capacitance will be very, very small. The guard makes the impedance of the shunt path (the path the signal must take to bypass the micro feature) that limits the operation much larger. The larger the fraction of the electrode connector that is covered by the guard, the less distortion of the measurement signal that will occur.

If the electrodes are small, then the capacitance of the electrode connector capacitance becomes relatively more important. Hence reducing the size of the electrode is limited if there is no guard. It is desirable to make the electrode as small as possible to reduce the sensor's manufacturing cost and to allow smaller cells to be monitored. Also, it is required to make the sensor electrodes small if a single cell is to fit on the electrodes, since cells have a typical diameter of about 10 μm.

The signal to noise ratio of the micro sensor without the guard is determined by the geometry of the sensor and the materials choice. The signal to noise ratio of the surface micro sensor with the guard is not determined by the parasitic elements, but by the accuracy of the electronics used to measure the trench impedance. The micro sensor with guard can therefore measure the micro feature impedance more accurately in a noisier environment.

For rinsing applications, the presence of ionic contaminants on the surface changes the resistivity of the surface even if very small concentrations (parts per billion level) are present. Therefore, the impedance measured between two electrodes will depend very much on the residual contamination of the surface. Even non-ionic impurities, directly and through interactions with other species present, change the dielectric properties of the surface, which in turn define the impedance. For drying applications, the removal of the water from the surface (replacing it with air, pure nitrogen or some other gas) will likewise result in a measurable change in impedance, since the difference between the conductivity of ultra pure water and air can easily be detected. Conduction along sidewalls can be measured, so that the amount of moisture adsorbed on the sidewalls or (slightly) conducting residual impurities on the sidewalls will be detected.

If the covering dielectric is a porous material, the surface micro sensor measures resistivity inside pores.

Furthermore, the surface micro sensor measures the full impedance spectrum, of which the resistivity is just a part (impedance is a complex number quantity that is dependent on frequency while resistance is the real part of the dc value of the impedance). This means that a large amount of other information, such as the dielectric absorption of the covering dielectric and the surface double layer and their frequency dependence is also available in the sensor's output data. The surface sensor can monitor specific ionic species and or non-ionic species (since these change the permittivity and surface adsorption). Because trace quantities of impurities can result in significant change in conductance or dielectric constant and because these electrical properties can be accurately measured, the sensitivity of the sensor is very good.

An exemplary process for fabricating a particular surface micro sensor 30 of the type shown in FIG. 1 is illustrated in FIGS. 5*a* through 5*g*.

As shown in FIG. 5*a*, a dielectric 112 such as SiO$_2$ is deposited with a typical thickness of about 3 μm on a substrate 113, which can be silicon, Si$_3$N$_4$, glass or a similar material. Optionally, if the substrate itself is a dielectric such as SiO$_2$, this step may be omitted. A conductor 114 such as copper or doped polysilicon with typical thickness of 0.5 μm is deposited on dielectric 112.

As shown in FIG. 5*b*, a photoresist 116 is deposited on conductor 114 and the pattern of the bottom portion of the electrode connector (42 and 43 shown in FIG. 1) is defined using photolithography and chemical etching.

Figure 5C:
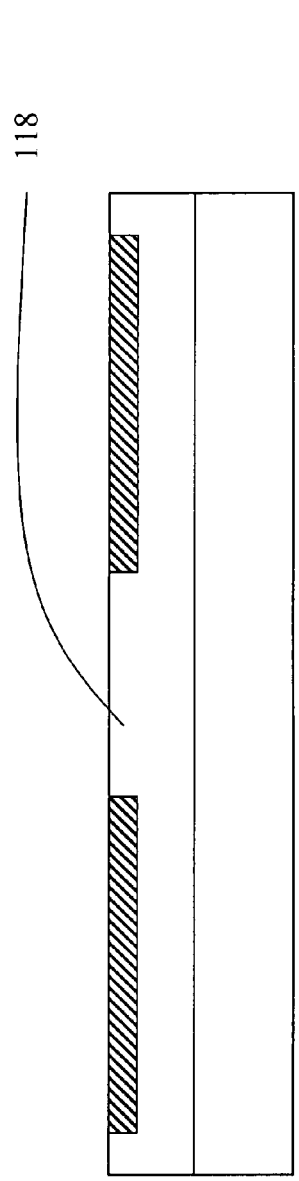

As shown in FIG. 5*c*, the photoresist is removed and a second dielectric 118, such as SiO$_2$ is deposited with a typical thickness of 1 μm on top of the conductor (114 as shown in FIG. 5*b*). The dielectric is made planar by polishing until the conductor is just exposed.

Figure 5D:
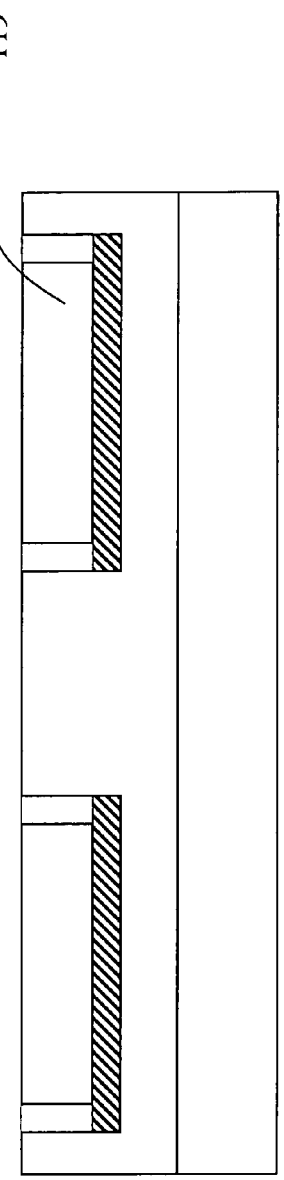

As shown in FIG. 5*d*, a third dielectric, such as SiO$_2$ 119, is deposited with a typical thickness of 3 μm. The dielectric is patterned to open the contacts to the electrode connector using photoresist deposition, photolithography and chemical etching. The photoresist is then removed.

Figure 5E:
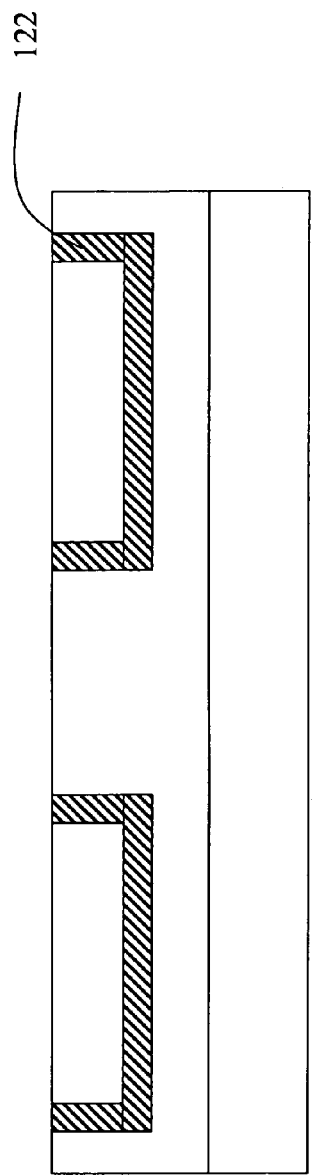

As shown in FIG. 5*e*, a conductor 122 such as W with typical thickness of 3 μm is deposited on dielectric 119 to fill the openings. The W is etched back so that it is only left in the contact openings (this process is called W plug formation in the microelectronics industry).

As shown in FIG. 5*f*, a conductor 124 such as copper or doped polysilicon with typical thickness of 0.5 μm is deposited on dielectric 119. A photoresist 126 is deposited on conductor 124 and the pattern of the electrodes (32 and 33 shown in FIG. 1) is defined using photolithography and chemical etching.

As shown in FIG. 5*g*, the photoresist is removed and a fourth dielectric 128, such as SiO$_2$ is deposited with a typical thickness of 1 μm on top of the conductor 124. The dielectric is made planar by polishing until the conductor is just exposed. The surface sensor fabrication is completed by depositing the capping dielectric layer 130. Typical dielectric films include silicon dioxide (SiO$_2$), silicon nitride (Si$_3$N$_4$), high-K dielectric materials (TiO$_2$) and low-K organic materials commonly used in the microelectronics manufacturing process. The contact openings to the electrode contacts are defined by deposition of photoresist, photolithography and chemical etching. The photoresist is then removed.

Figure 6:
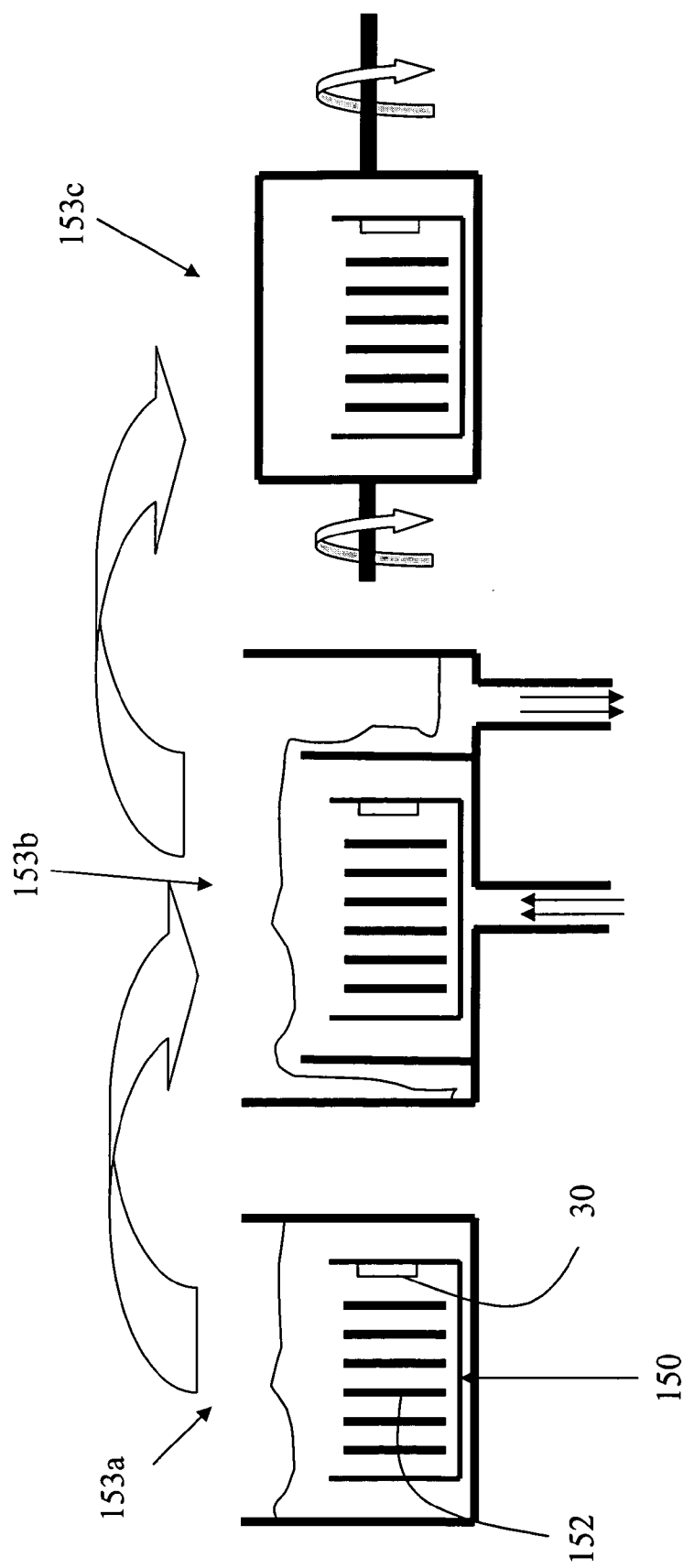
FIG. 6 is a diagram of a clean/rinse/dry process using the micro sensor.

The use of the surface micro sensor 30 to monitor the clean/rinse/dry process is illustrated in FIGS. 6-8. Typically, micro sensor 30 would be placed in a cleaning solution of a known ion concentration to calibrate the sensor. Once calibrated the surface micro sensor may be inserted in a cassette 150 with a number of other product wafers 152 and processed through a sequence of clean/rinse/dry baths 153*a*-153*c* as shown in FIG. 6 or mounted on a chuck 154 with a single wafer 156 and subjected to a sequence of clean/rinse/dry sprays 157 as shown in FIG. 7.

As shown in FIG. 8, as the surface micro sensor passes through the clean/rinse/dry cycle the measured impedance can change and the effective surface resistance determined from this measured impedance 158, changes fairly dramatically from a very low impedance during cleaning, to a moderate impedance during rinse and finally to a much higher impedance when the drying process is completed. By first calibrating the sensor to the allowable surface concentration, the rinse and dry process duration can be optimized. Also, by first calibrating the process and then monitoring the impedance during an actual production run, the wafers can be transferred from one process to the next to ensure adequate clean/rinse/dry without wasting time or chemicals. Alternatively, the sharp increases in impedance levels and subsequent leveling can be used to trigger a transfer to the next processing stage. If process calibration is both accurate and stable enough, e.g. the times to transfer, then it is possible that the micro sensor may not be needed during the actual production runs, but is merely used to periodically confirm that the process performance is still within specifications.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A micro sensor for electrochemical monitoring of surface residue, comprising:
    a supporting dielectric layer;
    first and second electrodes embedded in the surface of the dielectric layer, each said electrode comprising an active region that lies on the surface of the supporting dielectric layer and a connector beneath the active region;
    a thin covering dielectric layer over said electrodes and said supporting dielectric layer providing a fluid-solid interface at the surface of the covering dielectric layer, a region between said first and second electrodes filled with dielectric material from said supporting or thin covering dielectric layers; and
    a surface segment of said thin covering dielectric layer defined above and between the active regions of said first and second electrodes at the fluid-solid interface;
    said connectors adapted to carry an ac measurement signal to the active regions of the electrodes to measure a total sensor impedance sensitive to the impedance of said surface segment.

2. The micro sensor of claim 1, wherein the covering dielectric layer is the same dielectric as the supporting dielectric layer.

3. The micro sensor of claim 1, wherein the covering dielectric layer is a different dielectric than the supporting dielectric layer.

4. The micro sensor of claim 3, wherein the covering dielectric layer is a porous dielectric.

5. The micro sensor of claim 4, wherein the impedance of the surface segment is sensitive to the species of an aqueous solution in the bulk of the pores in the covering dielectric layer and to the species adsorbed onto the surface of the pores.

6. The micro sensor of claim 1, wherein the micro sensor is adapted to measure the impedance of a cell on the surface of the covering dielectric layer with the cell covering at least part of the active region of both electrodes.

7. The micro sensor of claim 1, wherein the covering dielectric layer has a thickness of 10 nm or less.

8. The micro sensor of claim 1, wherein the first and second electrodes are configured side-by-side, concentrically or as articulated fingers.

9. The micro sensor of claim 1, wherein the spacing between the first and second electrodes is 2 µm or less.

10. The micro sensor of claim 1, further comprising:
    first and second conductive guards embedded in the supporting dielectric whose voltages closely track the electrode voltages to shield the connectors from the surrounding environment and thereby reduce the loss of measurement signal through the parasitic capacitance associated with the connectors.

11. The micro sensor of claim 10, wherein said first and second conductive guards each comprise a first conductive layer between the connectors and a substrate and a second conductive layer between the connectors and the covering dielectric.

12. The micro sensor of claim 10, further comprising:
    first and second buffers that supply current to the first and second conductive guards so that the guard voltages closely track the electrode voltages without loading the measurement signal.

13. The micro sensor of claim 1, wherein the total sensor impedance is sensitive to the impedance along a top path through the surface segment and insensitive to the impedance along a shunt path through the dielectric material in the region between the electrodes.

14. The micro sensor of claim 1, wherein the connectors are spaced at least approximately 3 microns beneath the active regions of the electrodes.

15. A micro sensor for electrochemical monitoring of surface residue, comprising:
    a supporting dielectric layer;
    first and second electrodes embedded in the surface of the dielectric layer, each said electrode comprising an active region that lies on the surface of the supporting dielectric layer and a connector beneath the active region;
    a thin covering dielectric layer over said electrodes and said supporting dielectric layer providing a fluid-solid interface at the surface of the covering dielectric layer, a region between said first and second electrodes filled with dielectric material from said supporting or thin covering dielectric layers; and
    a surface segment of said thin covering dielectric layer defined above and between the active regions of said first and second electrodes at the fluid-solid interface;
    said connectors adapted to carry an ac measurement signal to the active regions of the electrodes to measure a total sensor impedance, said covering dielectric layer and electrode active regions configured so that the total sensor impedance is sensitive to the impedance of the surface segment and insensitive to the impedance of the dielectric material in the region between the electrodes.

16. A micro sensor for electrochemical monitoring of surface residue, comprising:
    a supporting dielectric layer;
    first and second electrodes embedded in the surface of the dielectric layer, each said electrode comprising an active region that lies on the surface of the supporting dielectric layer and a connector beneath the active region;
    a thin covering dielectric layer over said electrodes and said supporting dielectric layer providing a fluid-solid interface at the surface of the covering dielectric layer; and
    a surface segment of said thin covering dielectric layer defined above and between the active regions of said first and second electrodes at the fluid-solid interface, a discrete equivalent circuit of the distributed impedance of the surface segment comprising a first pair of capacitors formed between the respective electrodes and a solution at the surface of the thin cover dielectric, a second pair of capacitors formed between the respective electrodes and a surface double layer, a surface resistance between the electrodes and a bulk solution resistance between the electrodes, said covering dielectric layer and the electrode active regions configured so that the impedance of the first pair of capacitors is less than the impedance of the second pair of capacitors, the surface resistance and the bulk solution resistance;

said connectors adapted to carry an ac measurement signal to the active regions of the electrodes to measure a total sensor impedance sensitive to the impedance of said surface segment.

17. A micro sensor for electrochemical monitoring of surface residue, comprising:

a substrate;

a supporting dielectric layer on the substrate;

first and second electrodes embedded in the surface of the dielectric layer, each said electrode comprising an active region that lies on the surface of the supporting dielectric layer and a connector beneath the active region, each said connector having a first parasitic capacitance $C_{substrate}$ to the substrate and a second parasitic capacitance $C_{fluid}$ to the surface of the thin covering dielectric a thin covering dielectric layer over said supporting dielectric layer providing a fluid-solid interface at the surface of the covering dielectric layer;

a surface segment of said thin covering dielectric layer defined above and between the active regions of said first and second electrodes at the fluid-solid interface;

an impedance analyzer that applies an ac measurement signal between the first and second electrical connectors to measure a total sensor impedance sensitive to the impedance of the surface segment;

first and second conductive guards embedded in the supporting dielectric layer below or above the respective first and second electrical connectors; and first and second buffers each having a first input connected to opposite sides of the impedance analyzer and a second input connected to a buffer output, said buffers having unity gain bandwidth larger than the ac measurement signal frequency to supply current to the first and second conductive guards so that the guard voltages closely track the ac measurement signals applied to the first and second electrical connectors, respectively, to reduce the loss of ac measurement signal through $C_{substrate}$ or $C_{fluid}$.

18. The micro sensor of claim 17, wherein said first and second conductive guards each comprise a first conductive segment between the electrical connectors and the substrate to reduce the loss of ac measurement signal through $C_{substrate}$ and a second conductive segment between the electrical connectors and the covering dielectric to reduce the loss of ac measurement signal through $C_{fluid}$.

* * * * *